(12) United States Patent  
Phatak

(10) Patent No.: US 10,545,043 B2
(45) Date of Patent: Jan. 28, 2020

(54) FLOWMETER MANIFOLD WITH INDEXING BOSS

(71) Applicant: Micro Motion, Inc., Boulder, CO (US)

(72) Inventor: Abhijit Ashok Phatak, Pune (IN)

(73) Assignee: Micro Motion, Inc., Boulder, CO (US)

( * ) Notice: Subject to any disclaimer, the term of this patent is extended or adjusted under 35 U.S.C. 154(b) by 113 days.

(21) Appl. No.: 15/127,874

(22) PCT Filed: Apr. 21, 2014

(86) PCT No.: PCT/IN2014/000252
§ 371 (c)(1),
(2) Date: Sep. 21, 2016

(87) PCT Pub. No.: WO2015/162617
PCT Pub. Date: Oct. 29, 2015

(65) Prior Publication Data
US 2017/0089744 A1   Mar. 30, 2017

(51) Int. Cl.
G01F 15/18 (2006.01)
(52) U.S. Cl.
CPC .................... G01F 15/185 (2013.01)
(58) Field of Classification Search
None
See application file for complete search history.

(56) References Cited

U.S. PATENT DOCUMENTS

| 2,675,704 | A |   | 4/1954  | Raiteri |
|---|---|---|---|---|
| 3,771,363 | A | * | 11/1973 | Stapler .................. G01F 1/115 73/861.92 |
| 3,819,208 | A | * | 6/1974  | Janle ..................... F01N 3/26 285/363 |
| 4,020,873 | A | * | 5/1977  | Palarino ................ B65D 59/00 138/96 T |
| 4,656,830 | A |   | 4/1987  | Ohno et al. |
| 5,386,929 | A |   | 2/1995  | Dutt et al. |
| 5,401,062 | A | * | 3/1995  | Vowles ................... F16L 23/00 285/12 |
| 6,076,562 | A | * | 6/2000  | Kuo ........................ F16L 9/08 138/141 |
| 6,257,071 | B1 | * | 7/2001  | Dessert ................ G01F 1/3254 73/861.22 |

(Continued)

FOREIGN PATENT DOCUMENTS

DE  20310723 U1  11/2004
JP  10-232155 A   9/1998

(Continued)

Primary Examiner — Clayton E. LaBalle
Assistant Examiner — Dennis Hancock
(74) Attorney, Agent, or Firm — The Ollila Law Group LLC

(57) ABSTRACT

A flowmeter and a manifold for the same are provided according to an embodiment. The manifold comprises a body defining a first face and an opposing second face. A first orifice that projects into the body from the first face is defined by the body, and a second orifice that is also defined by the body projects into the body from the second face. The first and second orifices meet to define a fluid passage traversing through the body, and the second orifice is configured to fluidly connect to at least one flow tube of the flowmeter. At least one boss projects from the second face.

27 Claims, 9 Drawing Sheets

(56) References Cited

U.S. PATENT DOCUMENTS

| | | | |
|---|---|---|---|
| 9,506,793 B2 | 11/2016 | Sukemura et al. | |
| 2006/0015996 A1* | 1/2006 | Goettl | E04H 4/1236 4/507 |
| 2007/0277624 A1 | 12/2007 | Rieder et al. | |
| 2012/0079891 A1 | 4/2012 | Hussain et al. | |

FOREIGN PATENT DOCUMENTS

| | | | |
|---|---|---|---|
| JP | 2000329017 | A | 11/2000 |
| JP | 2013-228309 | A | 11/2013 |
| WO | 9319348 | A2 | 9/1993 |
| WO | 0165213 | A1 | 9/2001 |
| WO | 2006107297 | A1 | 10/2006 |

* cited by examiner

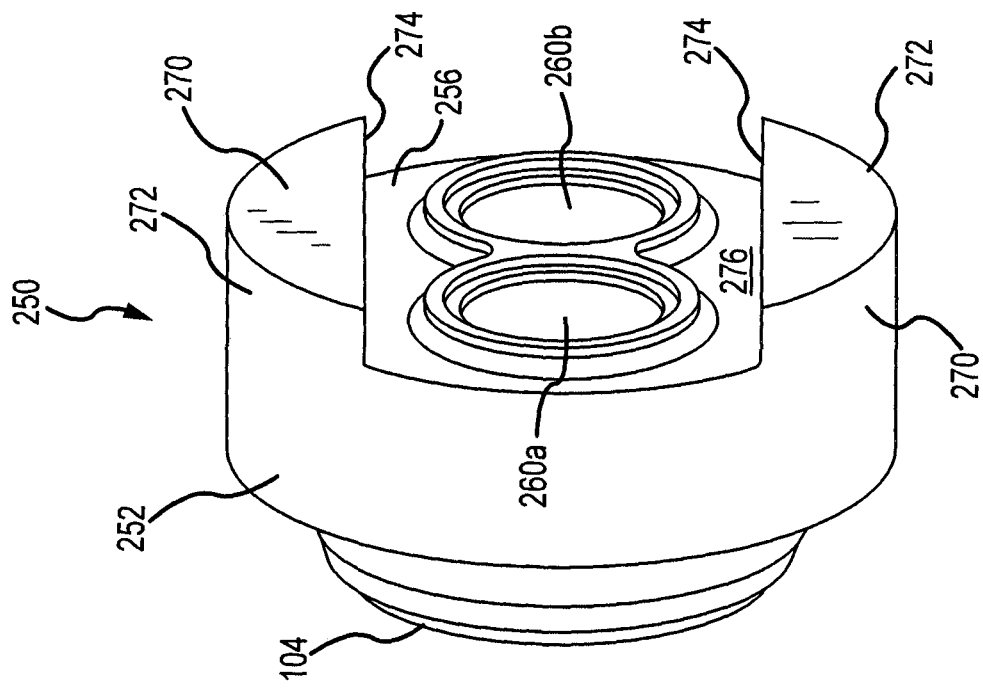
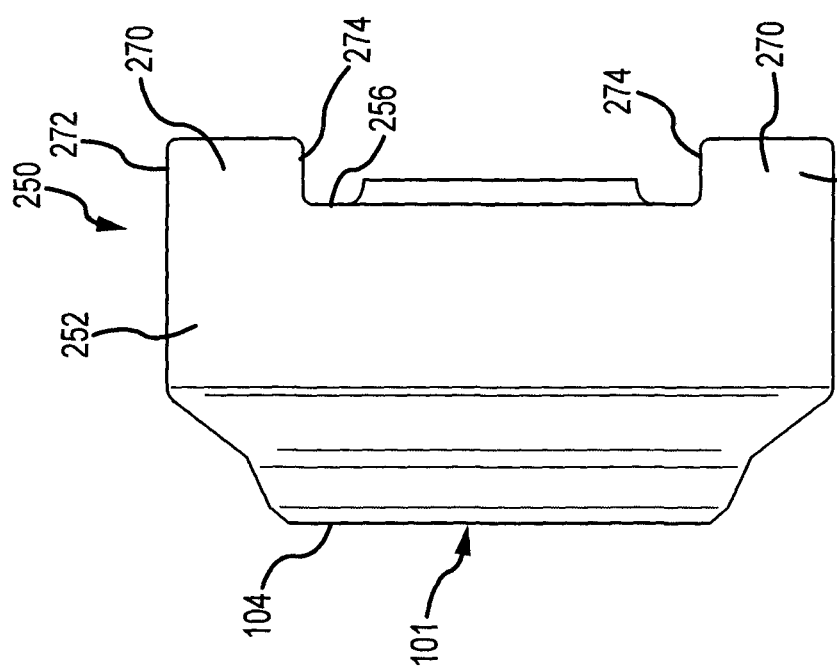

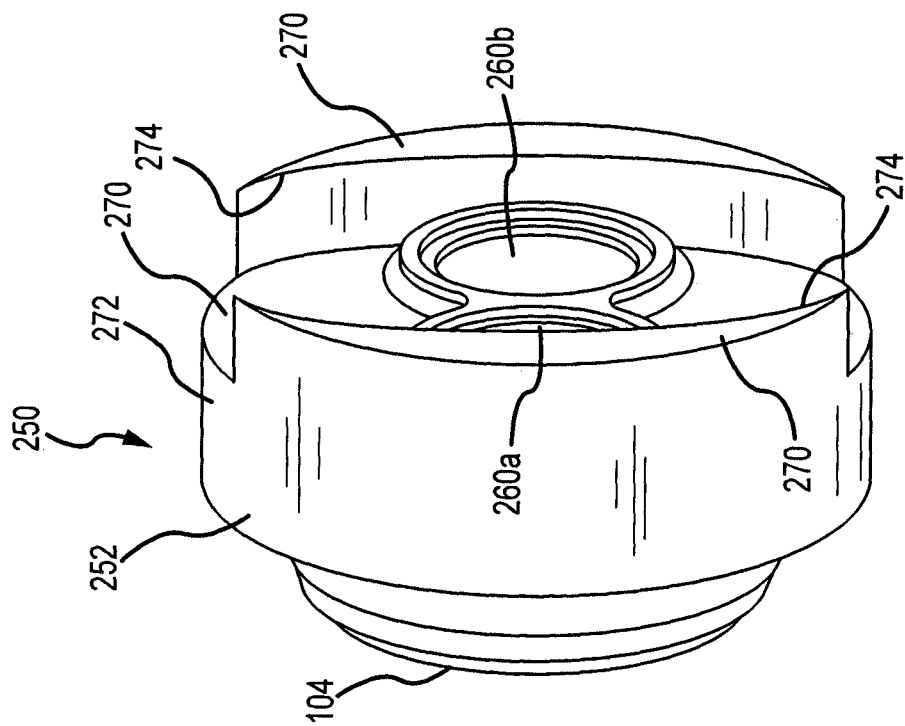
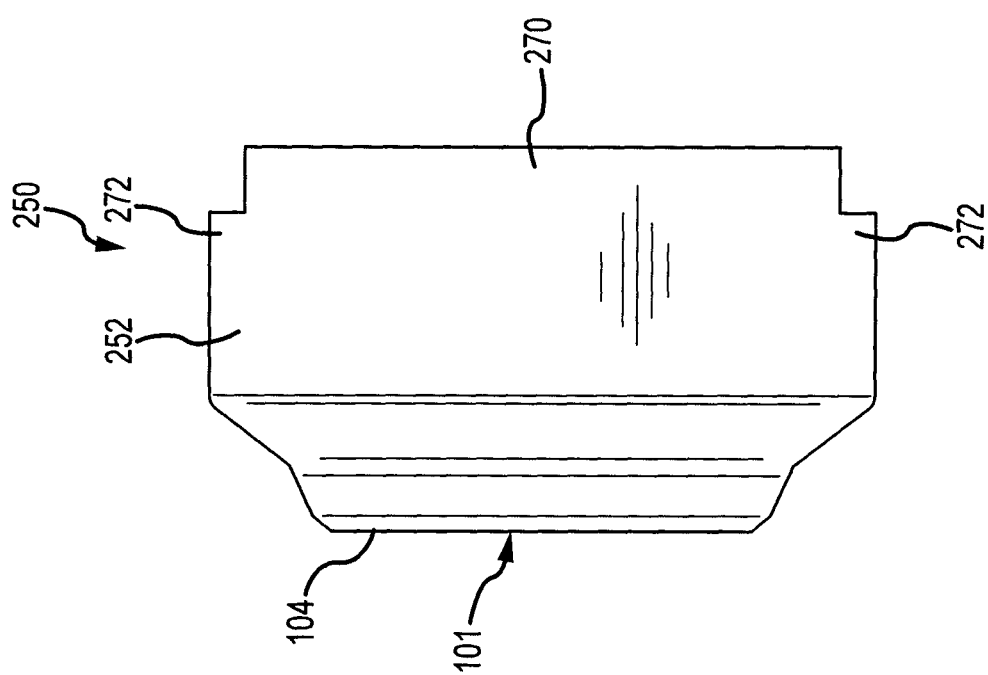
FIG. 4B
FIG. 4A

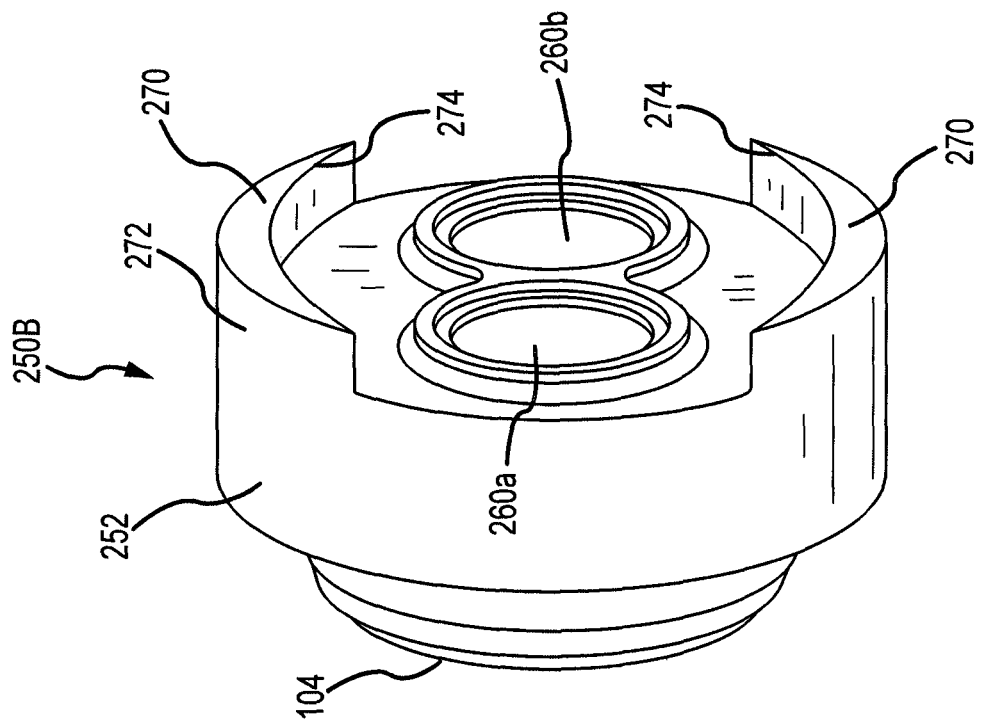
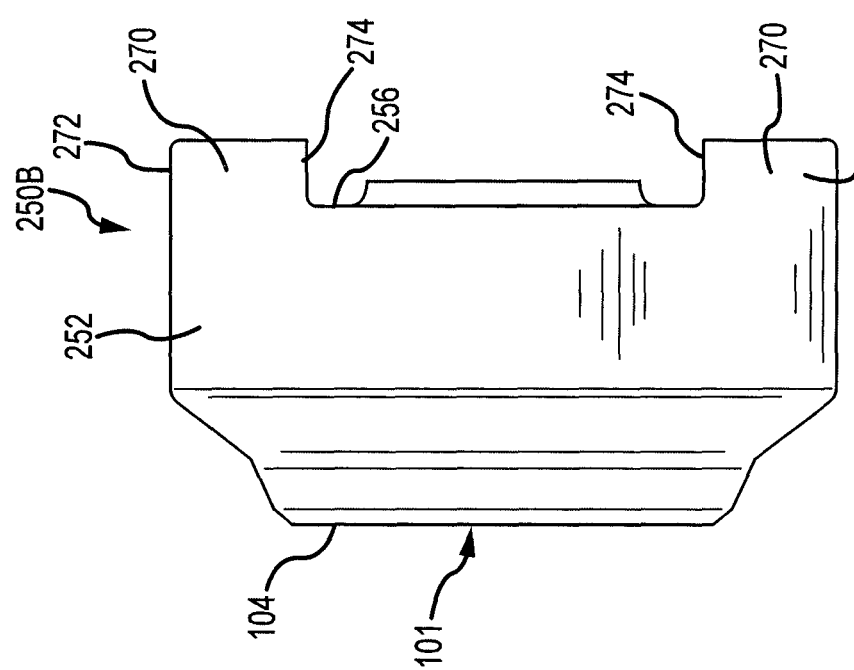
FIG.5B
FIG.5A

FLOWMETER MANIFOLD WITH INDEXING BOSS

FIELD OF THE INVENTION

The embodiments described below relate to vibrating meters, and more particularly, to an improved intake and outlet manifold having indexing bosses to aid in accurately assembling a flowmeter.

BACKGROUND

Vibrating flowmeters or conduit sensors, such as Coriolis mass flowmeters and vibrating densitometers, typically operate by detecting motion of a vibrating conduit that contains a flowing material. Properties associated with the material in the conduit, such as mass flow, density and the like, can be determined by processing measurement signals received from motion transducers associated with the conduit. The vibration modes of the vibrating material-filled system generally are affected by the combined mass, stiffness, and damping characteristics of the conduit and the material contained therein.

It is well known to use vibrating meters to measure mass flow and other properties of materials flowing through a pipeline. For example, vibrating Coriolis flowmeters are disclosed in U.S. Pat. No. 4,491,025 issued to J. E. Smith, et al. of Jan. 1, 1985 and also. Re. 31,450 to J. E. Smith of Nov. 29, 1983. These vibrating meters have one or more fluid tubes. Each fluid tube configuration in a Coriolis mass flow meter has a set of natural vibration modes, which may be of a simple bending, torsional, radial, lateral, or coupled type. Each fluid tube is driven to oscillate at resonance in one of these natural modes. The vibration modes are generally affected by the combined mass, stiffness, and damping characteristics of the containing fluid tube and the material contained therein, thus mass, stiffness, and damping are typically determined during an initial calibration of the vibrating meter using well-known techniques.

Material flows into the flow meter from a connected pipeline on the inlet side of the vibrating meter. The material is then directed through the fluid tube or fluid tubes and exits the flow meter to a pipeline connected on the outlet side.

A driver, such as a voice-coil style driver, applies a force to the one or more fluid tubes. The force causes the one or more fluid tubes to oscillate. When there is no material flowing through the flow meter, all points along a fluid tube oscillate with an identical phase. As a material begins to flow through the fluid tubes, Coriolis accelerations cause each point along the fluid tubes to have a different phase with respect to other points along the fluid tubes. The phase on the inlet side of the fluid tube lags the driver, while the phase on the outlet side leads the driver. Sensors are placed at two different points on the fluid tube to produce sinusoidal signals representative of the motion of the fluid tube at the two points. A phase difference of the two signals received from the sensors is calculated in units of time.

The phase difference between the two sensor signals is proportional to the mass flow rate of the material flowing through the fluid tube or fluid tubes. The mass flow rate of the material is determined by multiplying the phase difference by a flow calibration factor. The flow calibration factor is dependent upon material properties and cross sectional properties of the fluid tube. One of the major characteristics of the fluid tube that affects the flow calibration factor is the fluid tube's stiffness. Prior to installation of the flow meter into a pipeline, the flow calibration factor is determined by a calibration process. In the calibration process, a fluid is passed through the fluid tube at a given flow rate and the proportion between the phase difference and the flow rate is calculated. The fluid tube's stiffness and damping characteristics are also determined during the calibration process as is generally known in the art.

One advantage of a Coriolis flow meter is that the accuracy of the measured mass flow rate is not affected by wear of moving components in the flow meter, as there are no moving components in the vibrating fluid tube. The flow rate is determined by multiplying the phase difference between two points on the fluid tube and the flow calibration factor. The only input is the sinusoidal signals from the sensors indicating the oscillation of two points on the fluid tube. The phase difference is calculated from the sinusoidal signals. Since the flow calibration factor is proportional to the material and cross sectional properties of the fluid tube, the phase difference measurement and the flow calibration factor are not affected by wear of moving components in the flow meter.

A typical Coriolis mass flowmeter includes one or more transducers (or pickoff sensors), which are typically employed in order to measure a vibrational response of the flow conduit or conduits, and are typically located at positions upstream and downstream of the actuator. The pickoff sensors are connected to electronic instrumentation. The instrumentation receives signals from the two pickoff sensors and processes the signals in order to derive a mass flow rate measurement, among other things.

Typical Coriolis flow meters measure flow and/or density through the use of a coil and magnet as a pickoff sensor to measure the motion of a meter's vibrating flow tube/tubes. The mass flow rate through the meter is determined from the phase difference between multiple pickoff signals located near the inlet and outlet of the meter's flow tubes. However, it is possible to measure flow using strain gages in place of coil/magnet sensors. A fundamental difference between the two sensor types is that coil/magnet sensors measure the velocity of the flow tubes and strain gages measure the strain of the flow tubes.

Typically manifolds provide the inlet and outlet path for material entry and exit through the flow tubes, and these are generally coupled to flanges that attach to exterior conduits. The manifolds are coupled to the flow tubes and also the case portions. Additionally, spacers are often present between these items. Besides adding expense and weight, the assembly of these parts is cumbersome and prone to error and misalignment.

The embodiments described below overcome these and other problems and an advance in the art is achieved. The embodiments described below provide a manifold for a flowmeter with indexing bosses. An integrated flange is also contemplated. By combining a flange into the manifold, weight and complexity are lowered, and assembly is simplified. The integrated indexing bosses ensure that the manifold is aligned with the flow tubes and other internal flowmeter structures, thus ensuring efficient and accurate assembly. Additionally, the larger surface area provided by the bosses also stiffens the housing and indexes the housing to the manifold.

SUMMARY OF THE INVENTION

According to an aspect, a manifold of a flowmeter, comprises a body having a first face and an opposing second face. A first orifice is defined by the body, and projects into the body from the first face. A second orifice is also defined by the body, and projects into the body from the second face. The first and second orifices meet to define a fluid passage traversing through the body. The second orifice is configured to fluidly connect to at least one flow tube of the flowmeter. At least one boss projects from the second face.

According to an aspect, a manifold of a flowmeter comprises a cylindrical body having a first face and an opposing second face. The first face comprises a flange having a diameter that is larger than a diameter of the cylindrical body. A first orifice is defined by the body, and projects into the body from the first face, and a first minor orifice is defined by the body, and projects into the body from the second face. A second minor orifice is defined by the body, and projects into the body from the second face. The first minor orifice and second minor orifice converge into the first orifice, thereby defining a fluid passage that traverses through the cylindrical body. At least one boss projects from the second face, wherein an outer surface of the boss is arcuate.

According to an aspect, a flowmeter, comprises one or more flow tubes. A driver is coupled to the one or more flow tubes and oriented to induce a drive mode vibration in the one or more flow tubes. A sensor is coupled to the one or more flow tubes and is configured to detect the drive mode vibration. A manifold has a body, wherein the body defines a first face of the manifold and an opposing second face. A first orifice is defined by the body, and projects into the body from the first face, and a second orifice is defined by the body, and projects into the body from the second face. The first and second orifices meet to define a fluid passage that traverses through the body. The one or more flow tubes are in fluid communication with the fluid passage. At least one boss projects from the second face.

ASPECTS

According to an aspect, a manifold of a flowmeter, comprises: a body having a first face and an opposing second face; a first orifice defined by the body, wherein the first orifice projects into the body from the first face; a second orifice defined by the body, wherein the second orifice projects into the body from the second face, and wherein the first and second orifices meet to define a fluid passage traversing through the body, and wherein the second orifice is configured to fluidly connect to at least one flow tube of the flowmeter; and at least one boss that projects from the second face.

Preferably, the body is substantially cylindrical.

Preferably, the first face defines a flange.

Preferably, the flange comprises an outer diameter greater than an outer diameter defined by the second face.

Preferably, the manifold comprises a metal.

Preferably, the metal is at least one of stainless steel and titanium.

Preferably, the second orifice is bifurcated into a first minor orifice and a second minor orifice, wherein the first minor orifice and second minor orifice are each adapted to fluidly communicate with a first and second flow tube of the at least one flow tube, respectively.

Preferably, the at least one boss is oriented such that a long axis of the boss is substantially perpendicular to an axis that bisects both the first minor orifice and the second minor orifice.

Preferably, the at least one boss is oriented such that a long axis of the boss is substantially parallel to an axis that bisects both the first minor orifice and the second minor orifice.

Preferably, the at least one boss projects from the second face a distance that is between about 7% and about 15% of the length of an outer diameter defined by the second face.

Preferably, the at least one boss comprises: an arcuate outer surface; and a flat inner surface that is substantially a chord of an outer diameter defined by the second face.

Preferably, the arcuate outer surface comprises a diameter that is substantially equal to a diameter of the body.

Preferably, the at least one boss comprises: a first boss comprising an arcuate outer surface and a flat inner surface that is substantially a chord of an outer diameter defined by the second face; and a second boss comprising an arcuate outer surface and a flat inner surface that is substantially a chord of an outer diameter defined by the second face, wherein the second boss is positioned opposite the first boss.

Preferably, the at least one boss comprises a crescent shape, such that the boss comprises an arcuate outer surface and an arcuate inner surface.

Preferably, the arcuate outer surface comprises a diameter that is substantially equal to a diameter of the body.

According to an aspect, a manifold of a flowmeter, comprises: a cylindrical body defining having a first face and an opposing second face, wherein the first face comprises a flange having a diameter that is larger than a diameter of the cylindrical body; a first orifice defined by the body, wherein the first orifice projects into the body from the first face; a first minor orifice defined by the body, wherein the first minor orifice projects into the body from the second face; a second minor orifice defined by the body, wherein the second minor orifice projects into the body from the second face, and wherein the first minor orifice and second minor orifice converge into the first orifice, thereby defining a fluid passage that traverses through the cylindrical body; and at least one boss that projects from the second face, wherein an outer surface of the boss is arcuate.

Preferably, the at least one boss is oriented such that a long axis of the boss is substantially perpendicular to an axis that bisects both the first minor orifice and the second minor orifice.

Preferably, the at least one boss is oriented such that a long axis of the boss is substantially parallel to an axis that bisects both the first minor orifice and the second minor orifice.

Preferably, the at least one boss projects from the second face a distance that is between about 7% and about 15% of the length of an outer diameter defined by the second face.

Preferably, the at least one boss comprises a flat inner surface that perpendicularly extends from the second face, wherein the flat inner surface is a chord of the cylindrical body.

Preferably, the at least one boss comprises a crescent shape, such that the boss comprises an arcuate inner surface.

According to an aspect, a flowmeter, comprises: one or more flow tubes; a driver coupled to the one or more flow tubes and oriented to induce a drive mode vibration in the one or more flow tubes; a sensor coupled to the one or more flow tubes and configured to detect the drive mode vibration; a manifold having a body, wherein the body defines a first face of the manifold and an opposing second face; a first orifice defined by the body, the first orifice projecting into the body from the first face; a second orifice defined by the body, the second orifice projecting into the body from the second face, wherein the first and second orifices meet to define a fluid passage traversing through the body, and wherein the one or more flow tubes are in fluid communication with the fluid passage; and at least one boss that projects from the second face.

Preferably, the flowmeter further comprises a brace bar coupled to the one or more flow tubes wherein the at least one boss is of a size and dimension to engage the brace bar.

Preferably, the flowmeter further comprises a case portion having a size and dimension to encase the flow tubes, wherein the case portion is coupled to the manifold, and wherein the case portion is configured to index to the at least one boss.

Preferably, the one or more flow tubes index to the at least one boss.

Preferably, the body is substantially cylindrical.

Preferably, the first face defines a flange.

Preferably, the second orifice is bifurcated into a first minor orifice and a second minor orifice, wherein the first minor orifice and second minor orifices are each adapted to fluidly communicate with a first and second flow tube of the one or more flow tubes, respectively.

Preferably, the at least one boss is oriented such that a long axis of the boss is substantially perpendicular to an axis that bisects both the first minor orifice and the second minor orifice.

Preferably, the at least one boss is oriented such that a long axis of the boss is substantially parallel to an axis that bisects both the first minor orifice and the second minor orifice.

Preferably, the at least one boss comprises: an arcuate outer surface; and a flat inner surface that is substantially a chord of an outer diameter defined by the second face.

Preferably, the arcuate outer surface comprises a diameter that is substantially equal to a diameter of the body.

Preferably, the at least one boss comprises: a first boss comprising an arcuate outer surface and a flat inner surface that is substantially a chord of an outer diameter that is defined by the second face; and a second boss comprising an arcuate outer surface and a flat inner surface that is substantially a chord of an outer diameter that is defined by the second face, wherein the second boss is positioned opposite the first boss.

Preferably, the at least one boss comprises a crescent shape, such that the boss comprises an arcuate outer surface and an arcuate inner surface.

Preferably, the arcuate outer surface comprises a diameter that is substantially equal to a diameter of the body.

BRIEF DESCRIPTION OF THE DRAWINGS

The same reference number represents the same element on all drawings. The drawings are not necessarily to scale.

FIG. 3A illustrates a side view of an embodiment of a flowmeter manifold having a boss with a cross-sectional shape of a circle segment;

FIG. 3B illustrates an isometric view of an embodiment of a flowmeter manifold having a boss with a cross-sectional shape of a circle segment;

FIG. 4A illustrates a side view of an embodiment of a flowmeter manifold having a boss with a cross-sectional shape of a crescent;

FIG. 4B illustrates an isometric view of an embodiment of a flowmeter manifold having a boss with a cross-sectional shape of a crescent;

FIG. 5A illustrates a side view of another embodiment of a flowmeter manifold having a boss with a cross-sectional shape of a crescent;

FIG. 5B illustrates an isometric view of another embodiment of a flowmeter manifold having a boss with a cross-sectional shape of a crescent;

DETAILED DESCRIPTION OF THE INVENTION

FIGS. 1-6 and the following description depict specific examples to teach those skilled in the art how to make and use the best mode of embodiments of a flowmeter and related methods. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
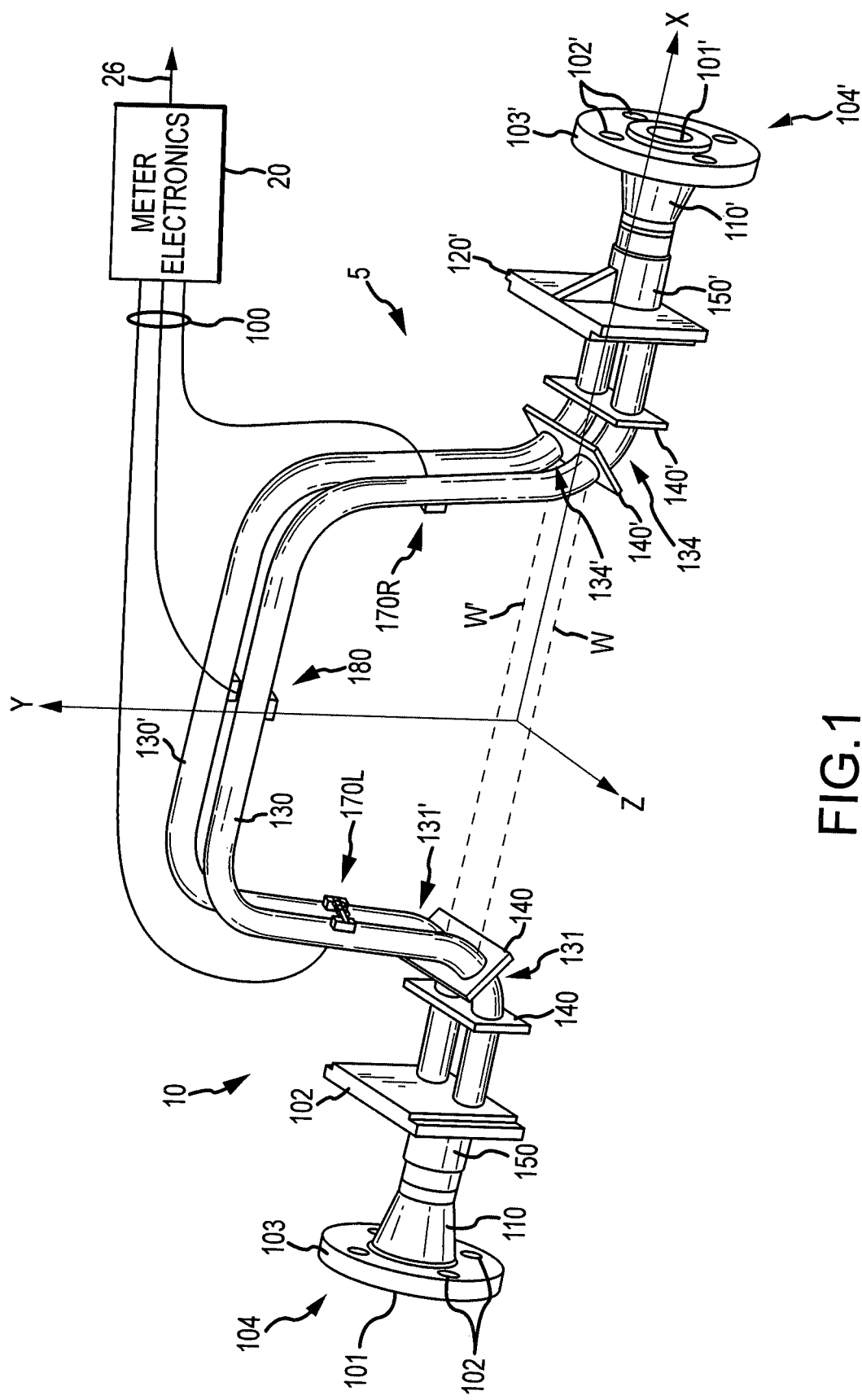
FIG. 1 illustrates a prior art flowmeter.

FIG. 1 illustrates a prior art flowmeter 5. The flowmeter 5 comprises a flowmeter assembly 10 and meter electronics 20. The meter assembly 10 responds to mass flow rate and density of a process material. Meter electronics 20 are connected to meter assembly 10 via leads 100 to provide density, mass flow rate, and temperature information over path 26, as well as other information not relevant to the present invention. Meter assembly 10 includes a pair of manifolds 150, and 150', flanges 103 and 103' having flange necks 110 and 110', a pair of parallel flow tubes 130 (first flow tube) and 130' (second flow tube), driver mechanism 180 such as a voice coil, temperature sensor 190, and a pair of pickoffs 170L and 170R, such as magnet/coil velocity sensors, strain gages, optical sensors, or any other pickoff type known in the art. The flow tube's 130 and 130' each have inlet legs 131 and 131' and outlet legs 134 and 134', which converge towards flow tube mounting blocks 120 and 120'. Flow tubes 130 and 130' bend at least one symmetrical location along their length and are essentially parallel throughout their length. Brace bars 140 and 140' serve to define the axis W and W' about which each flow tube oscillates.

The side legs 131, 131' and 134, 134' of flow tubes 130 and 130' are fixedly attached to flow tube mounting blocks 120 and 120' and these blocks, in turn, are fixedly attached to manifolds 150 and 150'. This provides a continuous closed material path through the Coriolis meter assembly 10.

When flanges 103 and 103', having holes 102 and 102' are connected, via first face 104 and second face 104' into a process line (not shown) which carries the process material that is being measured, material passes first face 104 of the meter through an orifice 101 in flange 103 and is conducted through manifold 150 to flow tube mounting block 120 having a surface 121. Within manifold 150 the material is divided and routed through flow tubes 130 and 130'. Upon exiting flow tubes 130 and 130', the process material is recombined in a single stream within manifold 150' and is thereafter routed past second face 104' connected by flange 103' having bolt holes 102' to the process line (not shown).

Flow tubes 130 and 130' are selected and appropriately mounted to the flow tube mounting blocks 120 and 120' so as to have substantially the same mass distribution, moments of inertia, and Young's modulus about bending axes W-W and W'-W', respectively. These bending axes go through brace bars 140 and 140'. Inasmuch as the Young's modulus of the flow tubes change with temperature, and this change affects the calculation of flow and density, a resistive temperature detector (RTD) (not shown) is mounted to flow tube 130', to continuously measure the temperature of the flow tube. The temperature of the flow tube and hence the voltage appearing across the RTD for a given current passing therethrough is governed by the temperature of the material passing through the flow tube. The temperature-dependent voltage appearing across the RTD is used in a well-known method by meter electronics 20 to compensate for the change in elastic modulus of flow tubes 130 and 130' due to any changes in flow tube temperature. The RTD is connected to meter electronics 20 by lead 195.

Both flow tubes 130 and 130' are driven by driver 180 in opposite directions about their respective bending axes W and W' at what is termed the first out-of-phase bending mode of the flow meter. This driver 180 may comprise any one of many well-known arrangements, such as a magnet mounted to flow tube 130' and an opposing coil mounted to flow tube 130, through which an alternating current is passed for vibrating both flow tubes 130, 130'. A suitable drive signal is applied by meter electronics 20, via a lead, to the driver 180.

Meter electronics 20 receive the RTD temperature signal on a lead (not shown), and the left and right velocity signals through leads as well. Meter electronics 20 produce the drive signal appearing on lead 185 to driver 180 and vibrate tubes 130 and 130'. Meter electronics 20 process the left and right velocity signals 165L, 165R and the RTD signal to compute the mass flow rate and the density of the material passing through meter assembly 10. This information, along with other information, is applied by meter electronics 20 over path 26 to utilization means.

Typically, Coriolis flowmeters have simple manifolds that are often multi-part assemblies. The multi-piece assemblies add weight and cost to flowmeters and also fail to prevent assembly errors and/or assembly inaccuracy. The flowmeter 5 manifolds disclosed herein provide at least an additional feature, bosses, which provide a guide for accurate assembly and also stiffen the case portion, which is often desirable given the extreme environments in which flowmeters are often needed.

Figure 2:
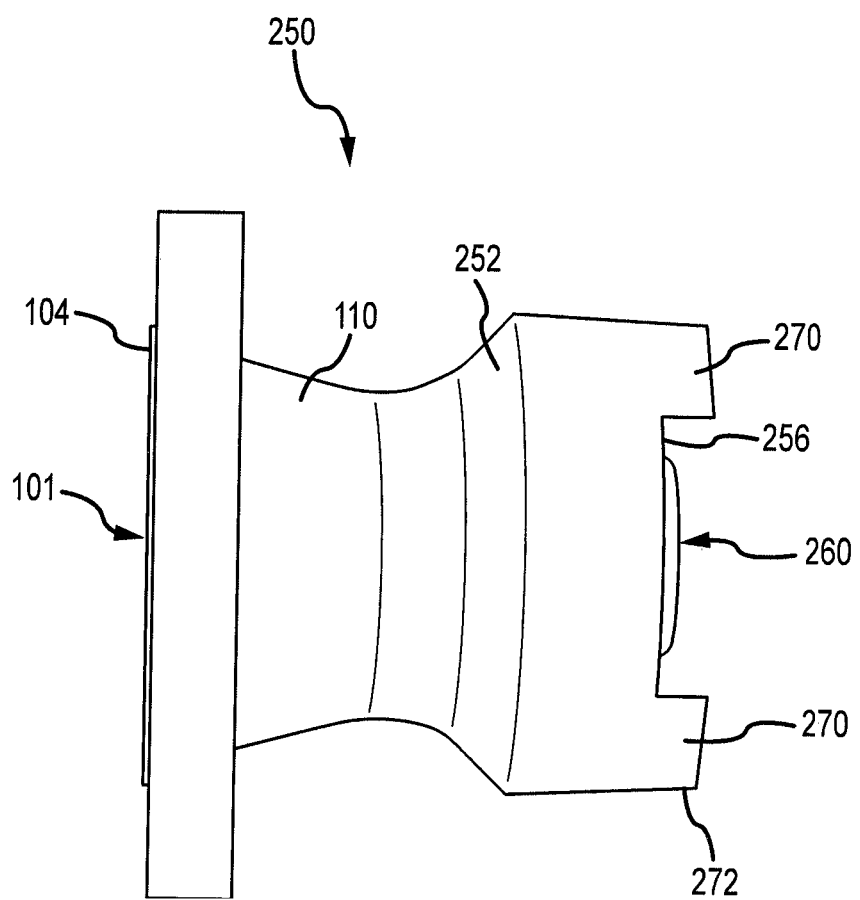
FIG. 2 illustrates an embodiment of a flowmeter manifold.

FIG. 2 illustrates an embodiment of a manifold 250 of a flowmeter 5. The manifold 250 is predominantly defined by a body 252 having a first face 104 that is opposed by a second face 256. The first face 104 defines a first orifice 101. The first orifice 101 is a passage that passes through the body 252. Similarly, a second orifice 260 is defined by the second face 256, and this orifice 260 also passes through the body 252, joining the first orifice 101, thus defining a flow path for process materials to pass through the manifold 250. The body 252 is preferably cylindrical, or at least comprises cylindrical portions, however non-cylindrical shapes are also contemplated.

Figure 6:
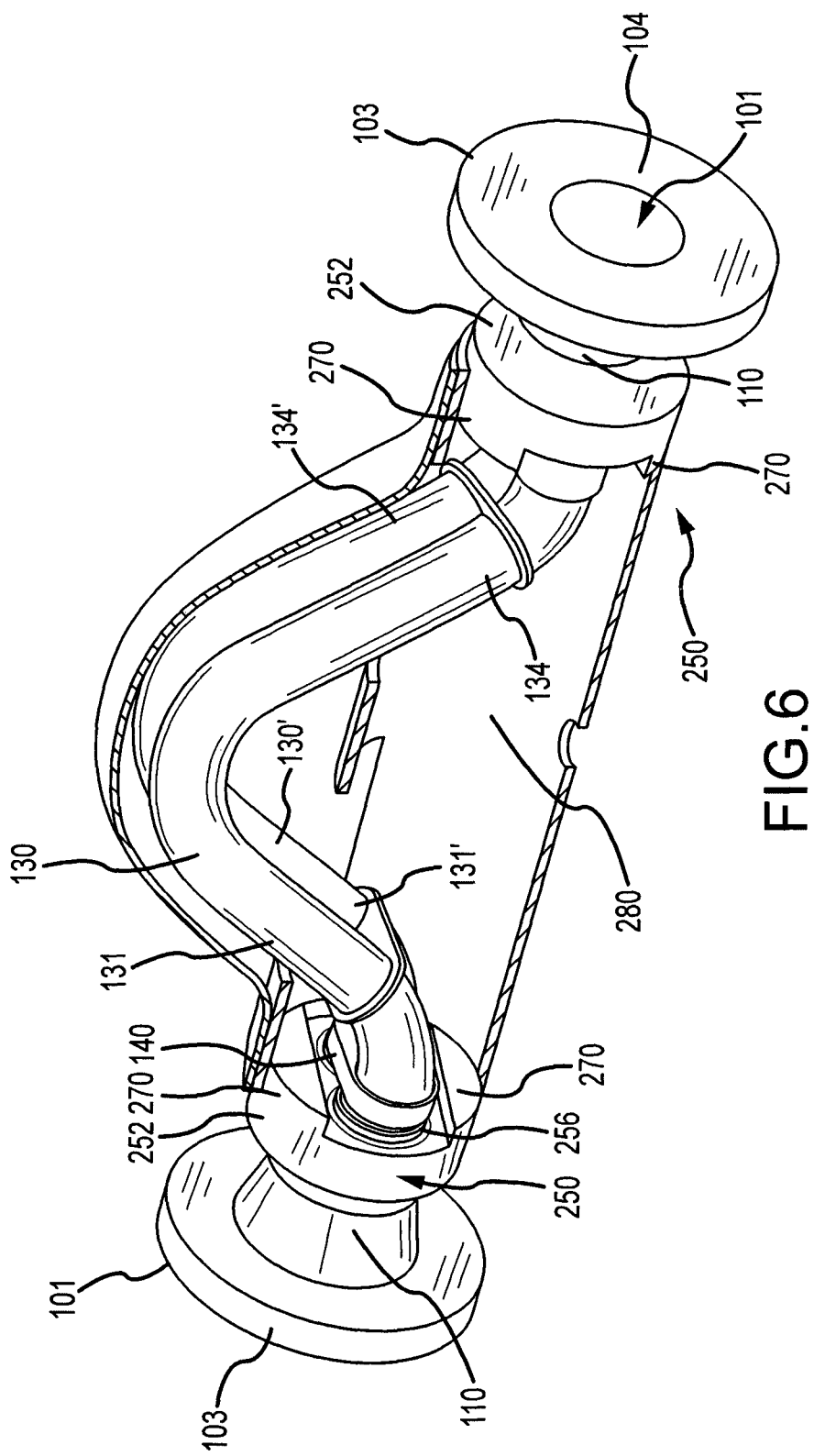
FIG. 6 illustrates an embodiment of a flowmeter with bossed manifolds.

With initial reference to FIG. 6, in an embodiment of a dual tube flowmeter 5, such as a vibratory flowmeter, flow tubes 130, 130' connect to a manifold 250 so that the inlet legs 131, 131' fluidly connect to both the first minor orifice 260A and the second minor orifice 260B, while the outlet legs 134, 134' connect to another manifold 250 via its first minor orifice 260A and second minor orifice 260B. Thus, process materials flowing into the flowmeter 5 from a conduit (not shown) enter the flowmeter 5 at the inlet side of the flowmeter 5 through a first orifice 101; enter the flow tubes 130, 130' via the first minor orifice 260A and the second minor orifice 260B; travel through the flow tubes 130, 130' to enter into the manifold 250 positioned at the outlet side of the flowmeter 5 through a first minor orifice 260A and the second minor orifice 260B; and then exit the flowmeter 5 through a first orifice 101.

Turning back to FIG. 2, in an embodiment, the first face 104 defines a flange 103. Preferably, the flange 103 has an outer diameter greater than either the diameter of the body 252 or a flange neck 110. The flange 103 may have holes 102 radially disposed proximate the circumference of the flange 103, for accepting fasteners so that the flange may be coupled to a conduit (not shown). The holes 102 may be tapped to accept threaded fasteners, for example without limitation. The flange 103, in an embodiment, is constructed from the same piece of material as the body 252, such as from machining or casting processes. In a related embodiment, a flange 103 is attached, such as by welding, for example, to the body 252. In embodiments wherein the manifold 250 is a unibody construction, the flange neck 110 size and dimension is defined by the process wherein the manifold 250 is machined, cast, or the like. In embodiments wherein the flange 103 is attached to the manifold 250, the flange neck 110 may be attached in between the manifold 250 and the flange 103, and is to be a size and dimension appropriate for the application. The preferred materials out of which the manifold 250 is made is metal, but ceramics, plastics, composites, and any other material known in the art is also contemplated. The preferred metals are stainless steel and titanium.

At least one boss 270 outwardly projects from the second face 256. The boss 270 is a projection that provides surfaces upon which flow tubes 130, 130', brace bars 140, 140', case portions 280, or even pickoffs 170R, 170L may be indexed or attached.

Figure 3C:
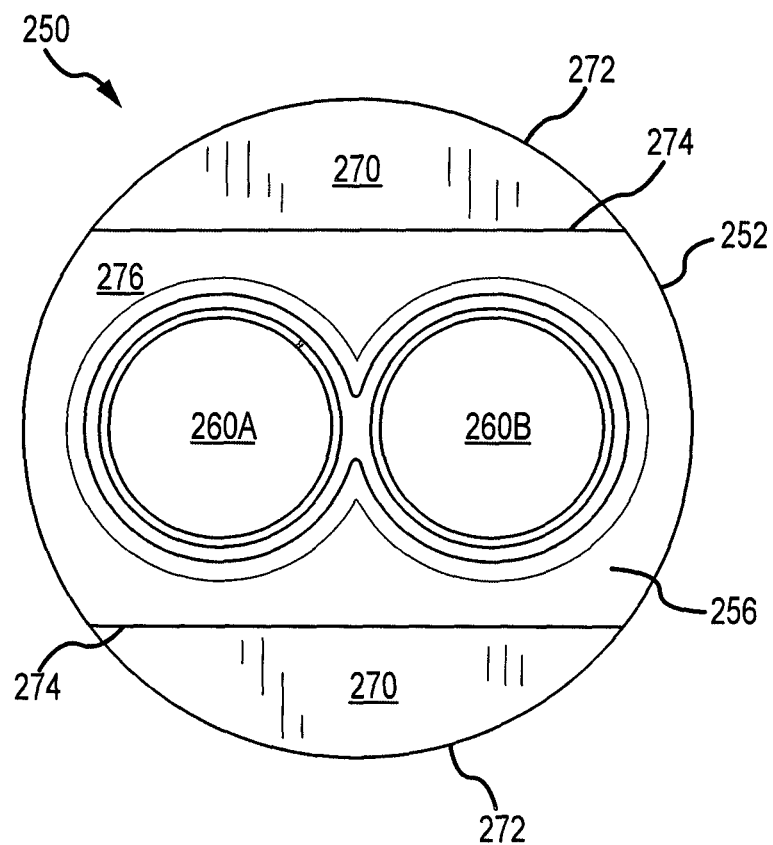
FIG. 3C illustrates a front view of an embodiment of a flowmeter manifold having a boss with a cross-sectional shape of a circle segment.

FIGS. 3A-C illustrate an embodiment wherein bosses 270 protrude distally from the second face 256. In this embodiment, each boss 270 has an arcuate portion that defines an outer surface 272 of the boss 270. The inner surface 274 of the boss defines a chord having end points that intersect with the arch of the outer surface 272, thus defining a boss having a cross-sectional shape that is, or approximates, a circle segment. As is illustrated, the bosses 270 are oriented such that a long axis of each boss is parallel with an axis that passes through both the diameter of the first minor orifice 260A and the diameter of the second minor orifice 260B. This orientation defines a semi-rectangular region 276. This semi-rectangular region 276 provides a space for flow tubes 130, 130' and/or brace bars 140, 140' to index against, such that proper alignment during assembly of the flowmeter 5 is ensured. The case portions 280, flow tubes 130, 130', and brace bars 140, 140' may also contact the inner surface 274 or outer surface 272 of the boss 270, as well as the manifold body 252 for indexing and attachment purposes.

In an embodiment, the second orifice 260 is bifurcated so to define a first minor orifice 260A and a second minor orifice 260B. In this case, process material that flows into the manifold 250 through the first orifice 101 flows through the flow path and exits the manifold 250 through both the first minor orifice 260A and the second minor orifice 260B. This would be the orientation of a manifold placed on the inlet side of a flowmeter 5, for example. Alternatively, process materials that flow from within the flowmeter to without the flowmeter would first pass through both the first minor orifice 260A and the second minor orifice 260B to converge into first orifice 101 before exiting the manifold 250.

Figure 4C:
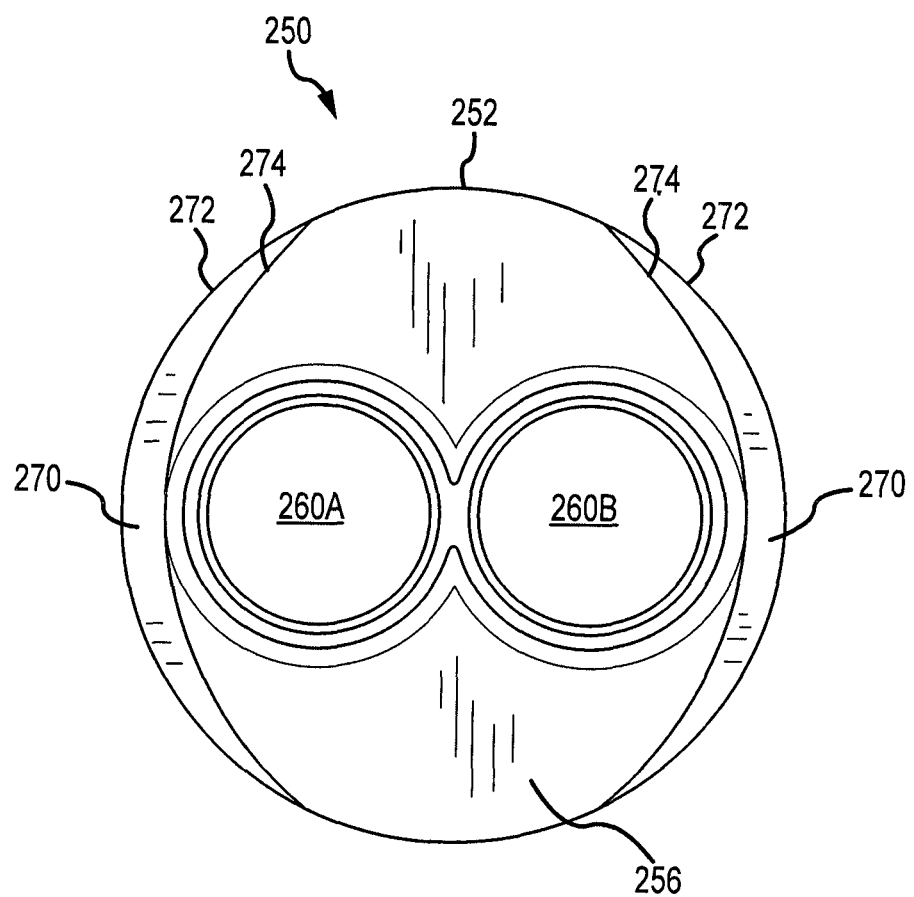
FIG. 4C illustrates a front view of an embodiment of a flowmeter manifold having a boss with a cross-sectional shape of a crescent.

FIGS. 4A-C also illustrate an embodiment wherein bosses 270 protrude distally from the second face 256. However, this embodiment has a cross-sectional shape of a crescent. Each boss 270 has an arcuate portion that defines an outer surface 272 of the boss 270. The inner surface 274 of the boss 270 also follows an arcuate path having end points that intersect with the arch of the outer surface 272, thus defining a boss 270 having a cross-sectional shape that is, or approximates, a crescent. As is illustrated, the bosses 270 are oriented such that a long axis of each boss 270 is parallel with an axis that passes through both the diameter of the first minor orifice 260A and the diameter of the second minor orifice 260B. The bosses 270 also define a space for flow tubes 130, 130' and/or brace bars 140, 140' to index against, such that proper alignment during assembly of the flowmeter 5 is ensured. The case portions 280, flow tubes 130, 130', and brace bars 140, 140' may also contact the inner surface 274 or outer surface 272 of the boss 270, as well as the manifold body 252 for indexing and attachment purposes.

Figure 5C:
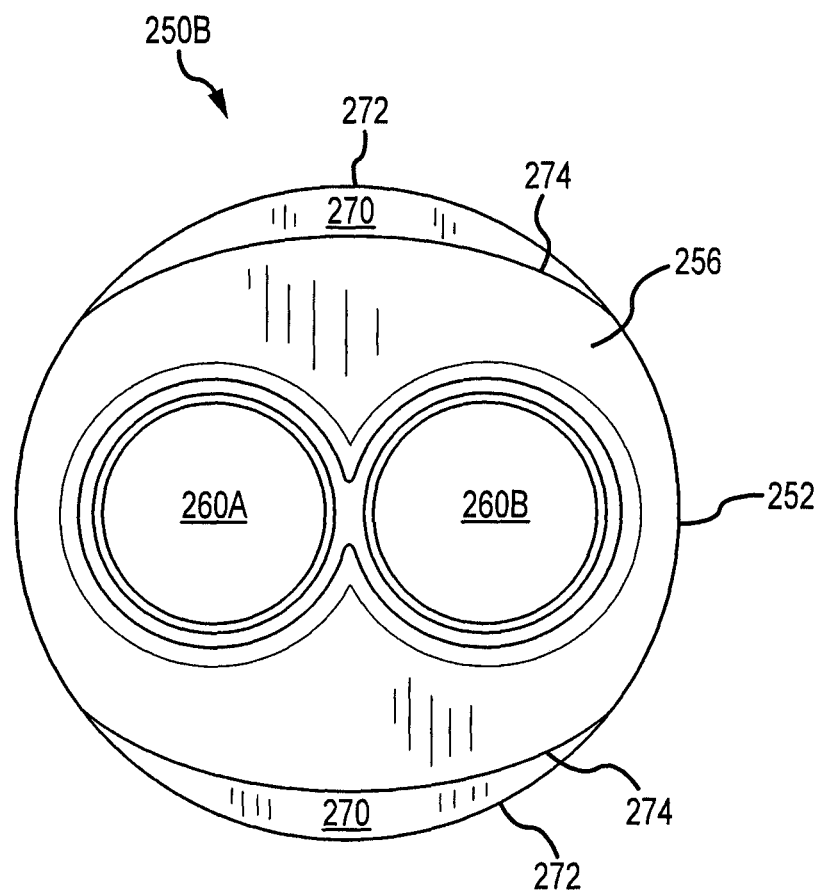
FIG. 5C illustrates a front view of another embodiment of a flowmeter manifold having a boss with a cross-sectional shape of a crescent.

In a similar embodiment, as illustrated by FIGS. 5A-C, bosses 270 protrude distally from the second face 256, having a cross-sectional shape that is, or approximates, a crescent, as in the above-described embodiment. However, as is illustrated, the bosses 270 are oriented such that a long axis of each boss 270 is perpendicular with an axis that passes through both the diameter of the first minor orifice 260A and the diameter of the second minor orifice 260B. As above, the bosses 270 define a space for flow tubes 130, 130' and/or brace bars 140, 140' to index against, such that proper alignment during assembly of the flowmeter 5 is ensured. The case portions 280, flow tubes 130, 130', and brace bars 140, 140' may also contact the inner surface 274 or outer surface 272 of the boss 270, as well as the manifold body 252 for indexing and attachment purposes.

The detailed descriptions of the above embodiments are not exhaustive descriptions of all embodiments contemplated by the inventor to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein can be applied to other devices and method, and not just to the embodiments described above and shown in the accompanying figures. Accordingly, the scope of the invention, should be determined from the following claims.

What is claimed is:

1. A manifold (250) of a flowmeter (5), comprising:
A body (252) having a first face (104) and an opposing second face (256);
a first orifice (101) defined by the body (252), wherein the first orifice (101) projects into the body (252) from the first face (104);
a second orifice (260) defined by the body (252), wherein the second orifice (260) projects into the body (252) from the second face (256), and wherein the first and second orifices (101, 260) meet to define a fluid passage traversing through the body (252), and wherein the second orifice (260) is configured to fluidly connect to at least one flow tube (130, 130') of the flowmeter (5); and
at least two bosses (270) that are unitary with, and project from the second face (256), wherein the at least two bosses (270) comprise an arcuate outer surface (272), and a flat inner surface (274) that is substantially a chord of an outer diameter defined by the second face (256), wherein the flat inner surface is configured to index against the one or more flow tubes (130, 130'), wherein a flow tube indexing surface is defined by a space between the bosses.

2. The manifold (250) of a flowmeter (5) of claim 1, wherein the body (252) is substantially cylindrical.

3. The manifold (250) of a flowmeter (5) of claim 1, wherein the manifold (250) comprises a metal.

4. The manifold (250) of a flowmeter (5) of claim 3, wherein the metal is at least one of stainless steel and titanium.

5. The manifold (250) of a flowmeter (5) of claim 1, wherein the second orifice (260) is bifurcated into a first minor orifice (260A) and a second minor orifice (260B), wherein the first minor orifice and second minor orifice (260A, 260B) are each adapted to fluidly communicate with a first and second flow tube (130, 130') of the at least one flow tube (130, 130'), respectively.

6. The manifold (250) of a flowmeter (5) of claim 5, wherein the at least two bosses (270) are oriented such that a long axis of the at least two bosses (270) is substantially perpendicular to an axis that bisects both the first minor orifice (260A) and the second minor orifice (260B).

7. The manifold (250) of a flowmeter (5) of claim 5, wherein the at least two bosses (270) are oriented such that a long axis of the at least two bosses (270) is substantially parallel to an axis that bisects both the first minor orifice (260A) and the second minor orifice (260B).

8. The manifold (250) of a flowmeter (5) of claim 1, wherein the at least two bosses (270) project from the second face (256) a distance that is between about 7% and about 15% of the length of an outer diameter defined by the second face (256).

9. The manifold (250) of a flowmeter (5) of claim 1, wherein the arcuate outer surface (272) comprises a diameter that is substantially equal to a diameter of the body (252).

10. The manifold (250) of a flowmeter (5) of claim 1, wherein the at least two bosses (270) comprise:
a first boss (270) comprising an arcuate outer surface (272) and a flat inner surface (274) that is substantially a chord of an outer diameter defined by the second face (256); and
a second boss (270) comprising an arcuate outer surface (272) and a flat inner surface (274) that is substantially a chord of an outer diameter defined by the second face (256), wherein the second boss (270) is positioned opposite the first boss (270).

11. A manifold (250) of a flowmeter (5), comprising:
a cylindrical body (252) defining having a first face (104) and an opposing second face (256), wherein the first face (104) comprises a flange (103) having a diameter that is larger than a diameter of the cylindrical body (252);

a first orifice (101) defined by the body (252), wherein the first orifice (101) projects into the body (252) from the first face (104);

a first minor orifice (260A) defined by the body (252), wherein the first minor orifice (260A) projects into the body (252) from the second face (256);

a second minor orifice (260B) defined by the body (252), wherein the second minor orifice (260B) projects into the body (252) from the second face (256), and wherein the first minor orifice (260A) and second minor orifice (260B) converge into the first orifice (101), thereby defining a fluid passage that traverses through the cylindrical body (252); and at least two bosses (270) that are unitary with, and project from the second face (256), wherein the at least one boss (270) comprises a crescent shape, such that the boss (270) comprises an arcuate outer surface (272) and an arcuate inner (274) surface, wherein the arcuate inner (274) surface is configured to index against the one or more flow tubes (130, 130'), wherein a flow tube indexing surface is defined by a space between the bosses.

12. The manifold (250) of a flowmeter (5) of claim 11, wherein the at least two bosses (270) are oriented such that long axes of the bosses (270) are substantially perpendicular to an axis that bisects the first minor orifice (260A) and the second minor orifice (260B).

13. The manifold (250) of a flowmeter (5) of claim 11, wherein the at least two bosses (270) are oriented such that long axes of the bosses (270) are substantially parallel to an axis that bisects both the first minor orifice (260A) and the second minor orifice (260B).

14. The manifold (250) of a flowmeter (5) of claim 11, wherein the at least two bosses (270) project from the second face (256) a distance that is between about 7% and about 15% of the length of an outer diameter defined by the second face (256).

15. A flowmeter (5), comprising:
one or more flow tubes (130, 130');
a driver (180) coupled to the one or more flow tubes (130, 130') and oriented to induce a drive mode vibration in the one or more flow tubes (130, 130');
a pickoff (170L, 170R) coupled to the one or more flow tubes (130, 130') and configured to detect the drive mode vibration;
a manifold (250) having a body (252), wherein the body (252) defines a first face (104) of the manifold (250) and an opposing second face (256);
a first orifice (101) defined by the body (252), the first orifice (101) projecting into the body (252) from the first face (104);
a second orifice (260) defined by the body (252), the second orifice (260) projecting into the body (252) from the second face (256), wherein the first and second orifices (101, 260) meet to define a fluid passage traversing through the body (252), and wherein the one or more flow tubes (130, 130') are in fluid communication with the fluid passage; and
at least two bosses (270) that are unitary with, and project from the second face (256), wherein the at least one boss (270) comprises an arcuate outer surface (272) and a flat inner surface (274) that is substantially a chord of an outer diameter defined by the second face (256), wherein the flat inner surface is configured to index against the one or more flow tubes (130, 130'), wherein a flow tube indexing surface is defined by a space between the bosses.

16. The flowmeter (5) of claim 15, further comprising:
a brace bar (140, 140') coupled to the one or more flow tubes (130, 130') wherein the at least one boss (270) is of a size and dimension to engage the brace bar (140, 140').

17. The flowmeter (5) of claim 15, further comprising:
a case portion (280) having a size and dimension to encase the flow tubes (130, 130'), wherein the case portion (280) is coupled to the manifold, and wherein the case portion (280) is configured to index to the at least one boss (270).

18. The flowmeter (5) of claim 15, wherein the one or more flow tubes (130, 130') index to the at least two bosses (270).

19. The flowmeter (5) of claim 15, wherein the body (252) is substantially cylindrical.

20. The flowmeter (5) of claim 15, wherein the first face (104) defines a flange (103).

21. The flowmeter (5) of claim 15, wherein the second orifice (260) is bifurcated into a first minor orifice (260A) and a second minor orifice (260B), wherein the first minor orifice and second minor orifice (260A, 260B) are each adapted to fluidly communicate with a first and second flow tube (130, 130') of the one or more flow tubes (130, 130'), respectively.

22. The flowmeter (5) of claim 21, wherein the at least two bosses (270) are oriented such that long axes of the bosses (270) are substantially perpendicular to an axis that bisects both the first minor orifice (260A) and the second minor orifice (260B).

23. The flowmeter (5) of claim 21, wherein the at least two bosses (270) are oriented such that long axes of the boss (270) is substantially parallel to an axis that bisects both the first minor orifice (260A) and the second minor orifice (260B).

24. The flowmeter (5) of claim 15, wherein the arcuate outer surface (272) comprises a diameter that is substantially equal to a diameter of the body (252).

25. The flowmeter (5) of claim 15, wherein the at least two bosses (270) comprise:
a second boss (270) comprising an arcuate outer surface (272) and a flat inner surface (274) that is substantially a chord of an outer diameter that is defined by the second face (256), wherein the second boss (270) is positioned opposite the first boss (270).

26. The flowmeter (5) of claim 15, wherein the arcuate outer surface (272) comprises a diameter that is substantially equal to a diameter of the body (252).

27. A flowmeter (5), comprising:
one or more flow tubes (130, 130');
a driver (180) coupled to the one or more flow tubes (130, 130') and oriented to induce a drive mode vibration in the one or more flow tubes (130, 130');
a pickoff (170L, 170R) coupled to the one or more flow tubes (130, 130') and configured to detect the drive mode vibration;
a manifold (250) having a body (252), wherein the body (252) defines a first face (104) of the manifold (250) and an opposing second face (256);
a first orifice (101) defined by the body (252), the first orifice (101) projecting into the body (252) from the first face (104);
a second orifice (260) defined by the body (252), the second orifice (260) projecting into the body (252) from the second face (256), wherein the first and second orifices (101, 260) meet to define a fluid passage traversing through the body (252), and wherein the one or more flow tubes (130, 130') are in fluid communication with the fluid passage; and at least one boss (270) that projects from the second face (256), wherein the at least one boss (270) comprises a crescent shape, such that the boss (270) comprises an arcuate outer surface (272) and an arcuate inner surface (274) wherein a flow tube indexing surface is defined by a space between the bosses.

\* \* \* \* \*